(12) United States Patent
Conti

(10) Patent No.: US 7,195,359 B1
(45) Date of Patent: Mar. 27, 2007

(54) FRAMING PROJECTOR WITH ADJUSTABLE SHUTTER

(76) Inventor: Mario W. Conti, 7044 Estrella de Mar Rd., Carlsbad, CA (US) 92008

( * ) Notice: Subject to any disclaimer, the term of this patent is extended or adjusted under 35 U.S.C. 154(b) by 289 days.

(21) Appl. No.: 11/044,835

(22) Filed: Jan. 28, 2005

(51) Int. Cl.
*G03B 21/14* (2006.01)
*F21S 8/00* (2006.01)

(52) U.S. Cl. .................................. 353/97; 362/281
(58) Field of Classification Search .............. 353/75, 353/88, 97; 362/281, 147–148
See application file for complete search history.

(56) References Cited

U.S. PATENT DOCUMENTS

| 4,468,720 A | 8/1984 | Arai | 362/281 |
| 4,623,956 A | 11/1986 | Conti | 362/148 |
| 5,510,969 A * | 4/1996 | Rodger et al. | 362/281 |
| 5,904,417 A * | 5/1999 | Hewett | 362/281 |
| 2002/0060911 A1* | 5/2002 | Brockmann et al. | 362/281 |

* cited by examiner

*Primary Examiner*—Christopher Mahopney
(74) *Attorney, Agent, or Firm*—Edgar W. Averill, Jr.; Kenneth L. Green

(57) ABSTRACT

A light fixture includes an adjustable shutter to illuminate a desired area. The fixture resides substantially behind a room surface (e.g., a ceiling) and includes a fixed portion residing on and behind the surface, and a movable portion which is extendable from the surface for adjustment of the shutter. A tilting member rotates in a rotating member to allow two axis of adjustment. A light bulb mounts in the tilting member, and light from the bulb is reflected by a mirror or prism to provide a compact fixture. A four part shutter is imposed between the bulb and the mirror or prism to adjust the shape and area which is illuminated.

20 Claims, 8 Drawing Sheets

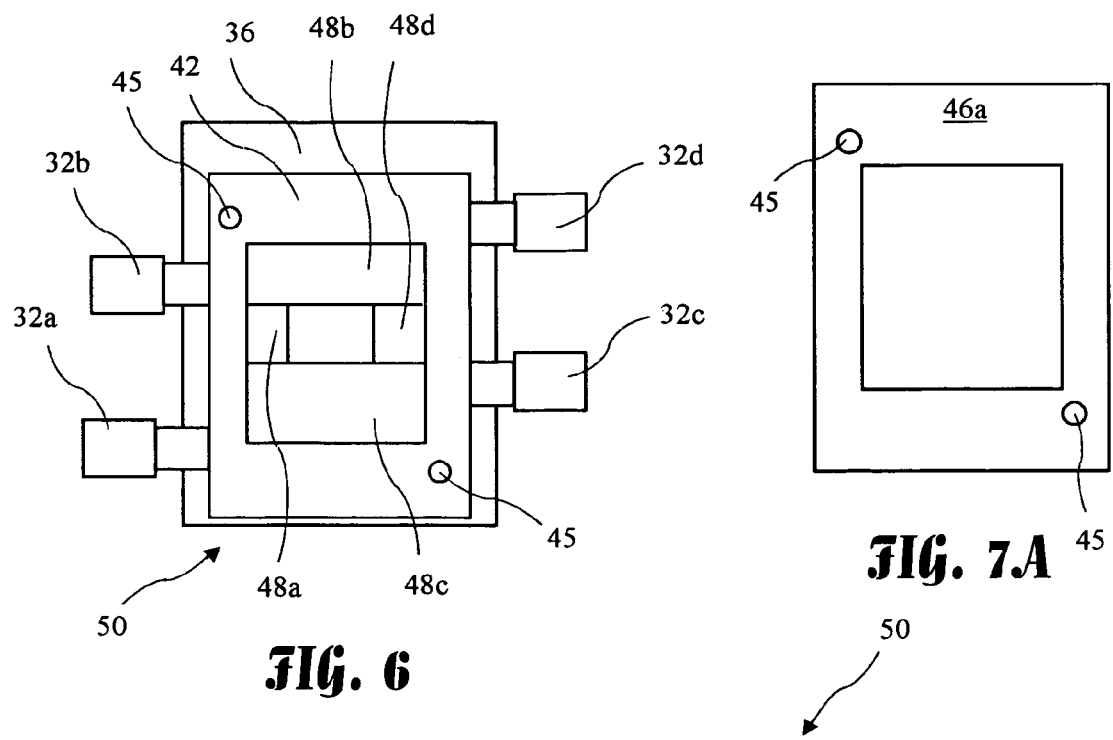
FIG. 6
FIG. 7A
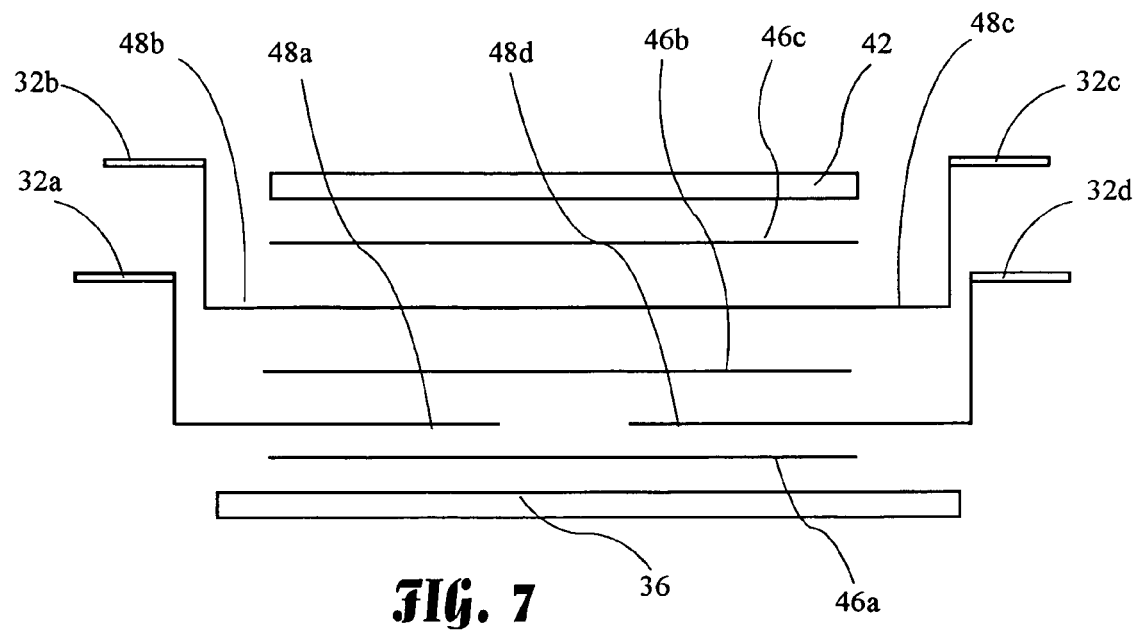
FIG. 7

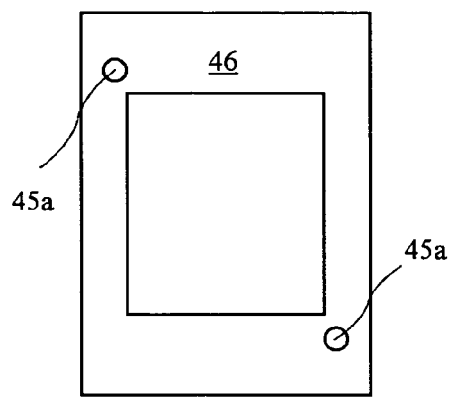
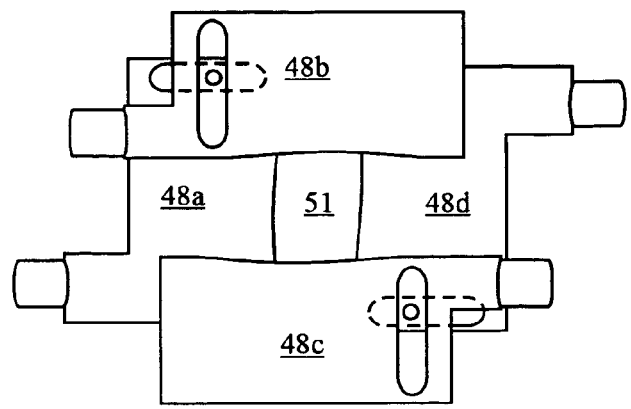
*FIG. 8*  *FIG. 9*
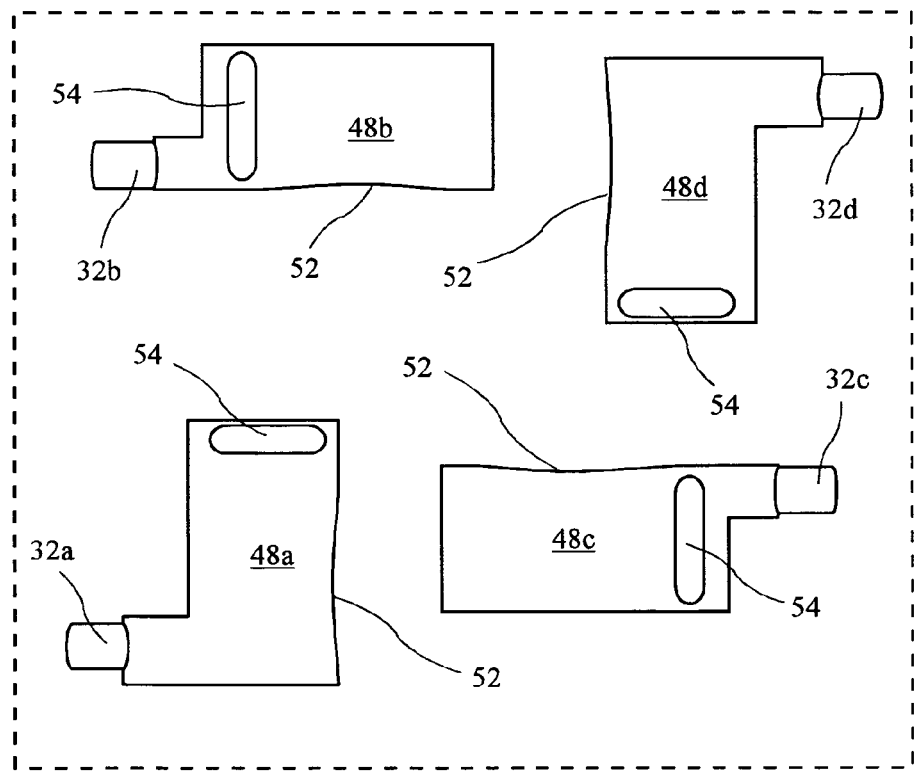
*FIG. 10*

FRAMING PROJECTOR WITH ADJUSTABLE SHUTTER

BACKGROUND OF THE INVENTION

The present invention relates to recessed lighting fixtures and in particular to a ceiling lighting fixture with an adjustable shutter for controlled illumination.

Various forms of wall hung art benefit from illumination. Such art may benefit particularly from light sources residing on or in a ceiling because of the non-invasive nature of ceiling mounted lighting fixtures. U.S. Pat. No. 4,623,956 for "Recessed Adjustable Lighting Fixture," describes a lighting fixture suitable for mounting in a ceiling. The lighting fixture of the '956 patent includes a pivoting light platform and a mirror or prism for directing the light towards a wall. Although the fixture of the '956 patent resides mostly above the ceiling, the light pattern resulting on a wall has a trapezoidal or a skewed shape, and does not uniformly frame art work hung on the wall.

A light with an adjustable pattern is described in U.S. Pat. No. 4,468,720 for "Variable Mask Device for an Illuminator." The ''720 patent describes a mask with four independent plates which may be shifted to form a desired pattern on a wall. Although the light fixture described in the '720 patent allows adjustment of four sides of a light pattern, the fixture is designed to mount in front of a surface, not behind a surface, and is thus invasive into a room. Further, the mask is adjusted using knobs extending outward from all four sides of the fixture. While such adjusting knobs may be suitable for a fixture residing well away from a mounting surface, the knobs are not easily manipulated if the fixture is adapted to reside behind a surface. Additionally, plates attached to the knobs are sandwiched between a support frame pair urged together by pressure plates, and may be difficult to move. The '956 patent and the '720 patent are herein incorporated by reference.

BRIEF SUMMARY OF THE INVENTION

The present invention addresses the above and other needs by providing a light fixture which includes an adjustable shutter to illuminate a desired area. The fixture resides substantially behind a room surface (e.g., a ceiling) and includes a fixed portion residing on and behind the surface, and a movable portion which is extendable from the surface for adjustment of the shutter. A tilting member rotates in a rotating member to allow two axis of adjustment. A light bulb mounts in the tilting member, and light from the bulb is reflected by a mirror or prism to provide a compact fixture. A four part shutter is imposed between the bulb and the mirror or prism to adjust the shape and area which is illuminated In accordance with one aspect of the invention, there is provided a framing projector comprising a trim plate adapted to reside proximal to a surface, a projector body tiltably connected to the trim plate and passing through the trim plate, a light source attached to the projector body, a reflector adapted to direct light from the light source, an adjustable aperture residing between the light source and the reflector, and a canister mountable substantially behind the surface. The adjustable aperture comprises a first shutter having a first handle, a second shutter having a second handle, a third shutter having a third handle, and a fourth shutter having a fourth handle. The trim plate mechanically cooperates with the canister to allow the trim plate to be pulled away from the surface to allow access to the handles. The body is tiltable to position an area of illumination and the shutters are adjustable using the handles to adjust the shape of the illumination.

In accordance with another aspect of the invention, there is provided a framing projector comprising a trim plate adapted to reside proximal to a surface, a projector assembly tiltably connected to the trim plate and passing through the trim plate, a light source attached to the projector assembly, a reflector adapted to direct light from the light source, and an adjustable aperture residing between the light source and the reflector. The adjustable aperture comprises a first shutter having a first handle, a second shutter having a second handle, a third shutter having a third handle, and a fourth shutter having a fourth handle. The projector assembly is tiltable to position an area of illumination and the shutters are adjustable using handles to adjust the shape and size of the illumination. The adjustable aperture has four aperture sides and the handles extend from two opposite sides of the four aperture sides.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 6 is a detailed top view of the aperture assembly.

FIG. 7 is a detailed side view of the aperture assembly in an expanded form.

FIG. 8 is a hold-down plate of the aperture assembly.

FIG. 9 shows shutters of the aperture assembly.

FIG. 10 shows the shutters of the aperture assembly separated.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
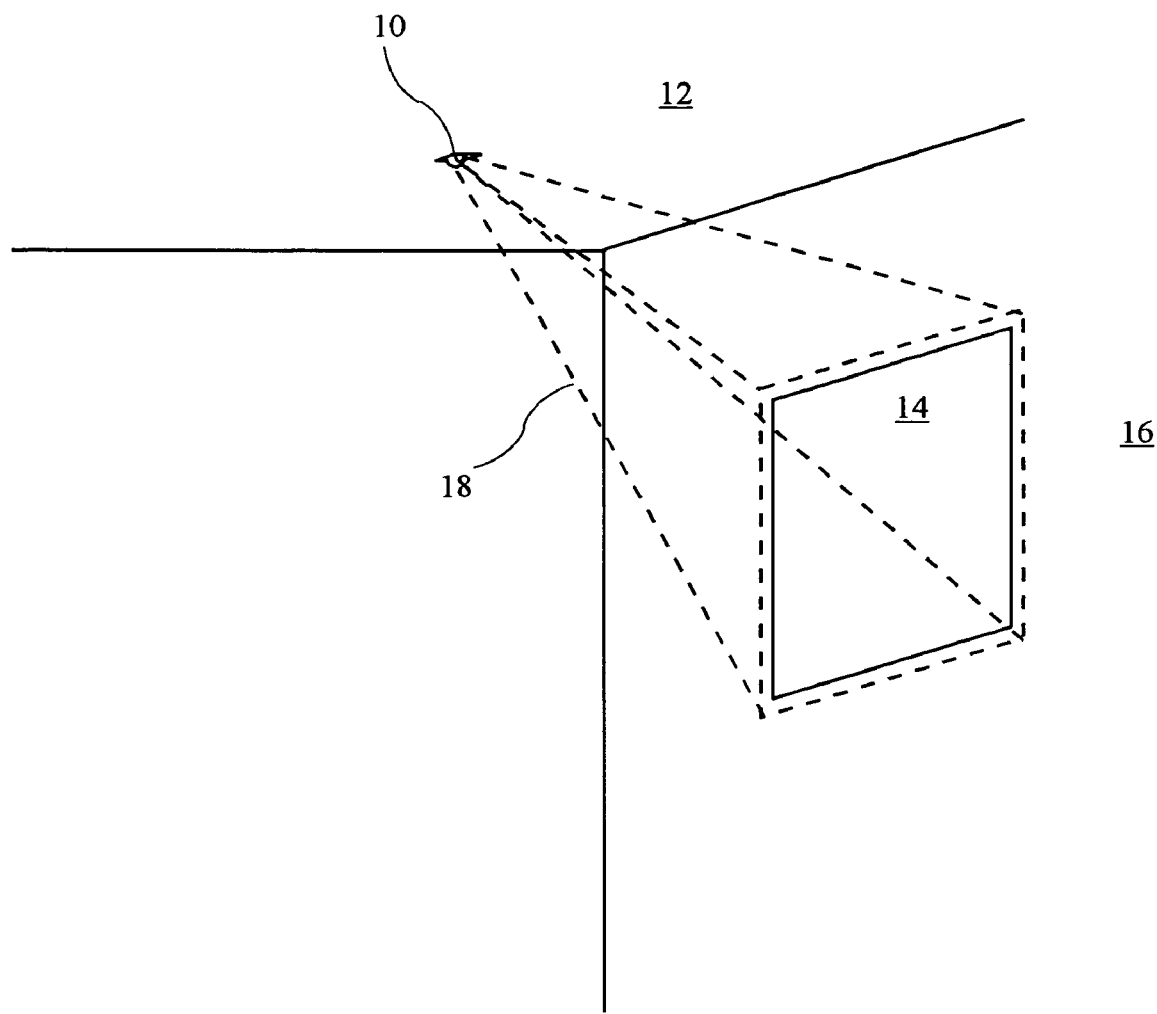
FIG. 1 shows a framing projector according to the present invention illuminating a picture hanging on a wall.

A framing projector 10 according to the present invention is shown illuminating a wall hanging 14, for example a painting or the like, on a wall 16 in FIG. 1. The framing projector 10 is mounted to a ceiling 12, but may be mounted to any surface. The framing projector 10 generates illumination 18 which may be adjusted to illuminate the wall hanging 14.

Figure 2A:
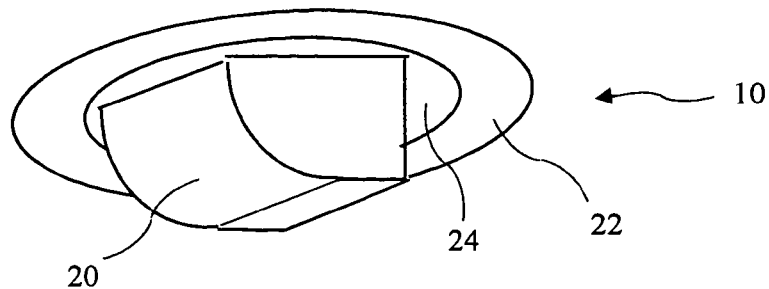
FIG. 2A is a detailed rear quarter perspective view of the framing projector.
Figure 2B:
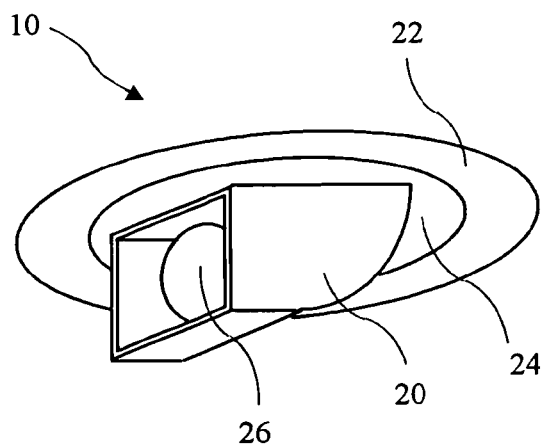
FIG. 2B is a detailed front quarter perspective view of the framing projector.

A detailed rear quarter perspective view of the framing projector 10 is shown in FIG. 2A and a detailed front quarter perspective view of the framing projector 10 is shown in FIG. 2B. The framing projector 10 includes an outer trim ring 22 which reside proximal to a surface, and inner trim ring 24 which is rotatable with respect to the outer trim ring 22, and a projector body 20 which tilts in the inner trim ring 24. The rotation of the inner trim ring 24, and tilt of the projector body 20, allow adjustment of the position of the illumination 18 (see FIG. 1.)

Figure 2C:
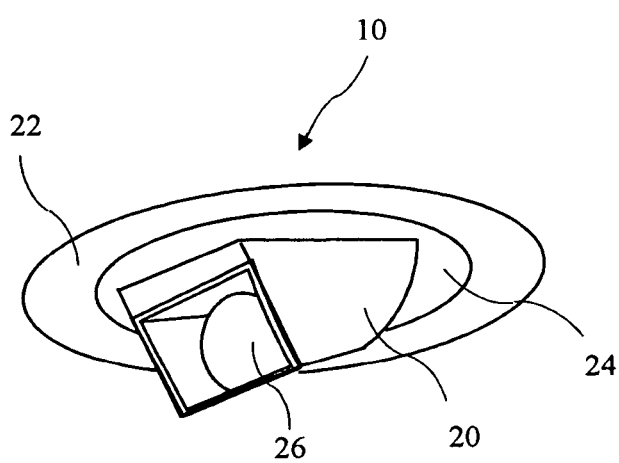
FIG. 2C is a detailed front quarter perspective view of the framing projector, with a projector body in a tilted position.

A detailed front quarter perspective view of the framing projector 10, with the projector body 20 in a tilted position is shown in FIG. 2C.

Figure 3A:
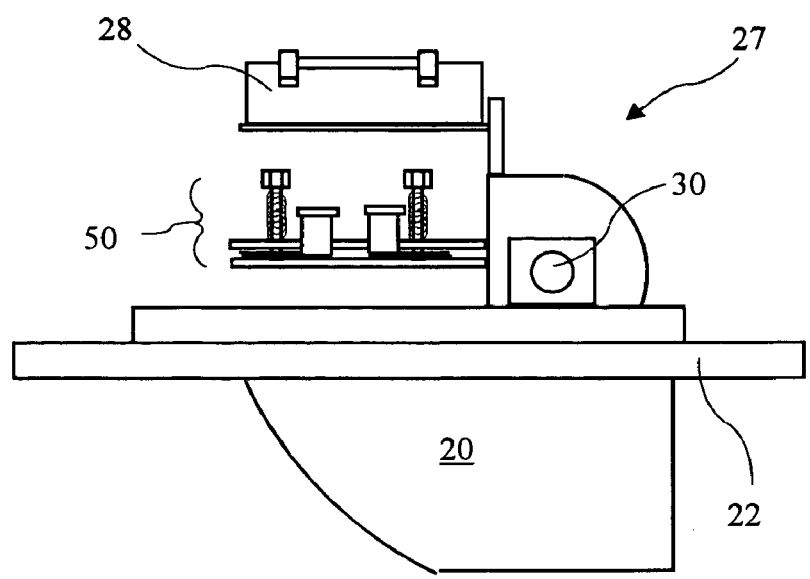
FIG. 3A is a side view of a projector assembly.
Figure 3B:
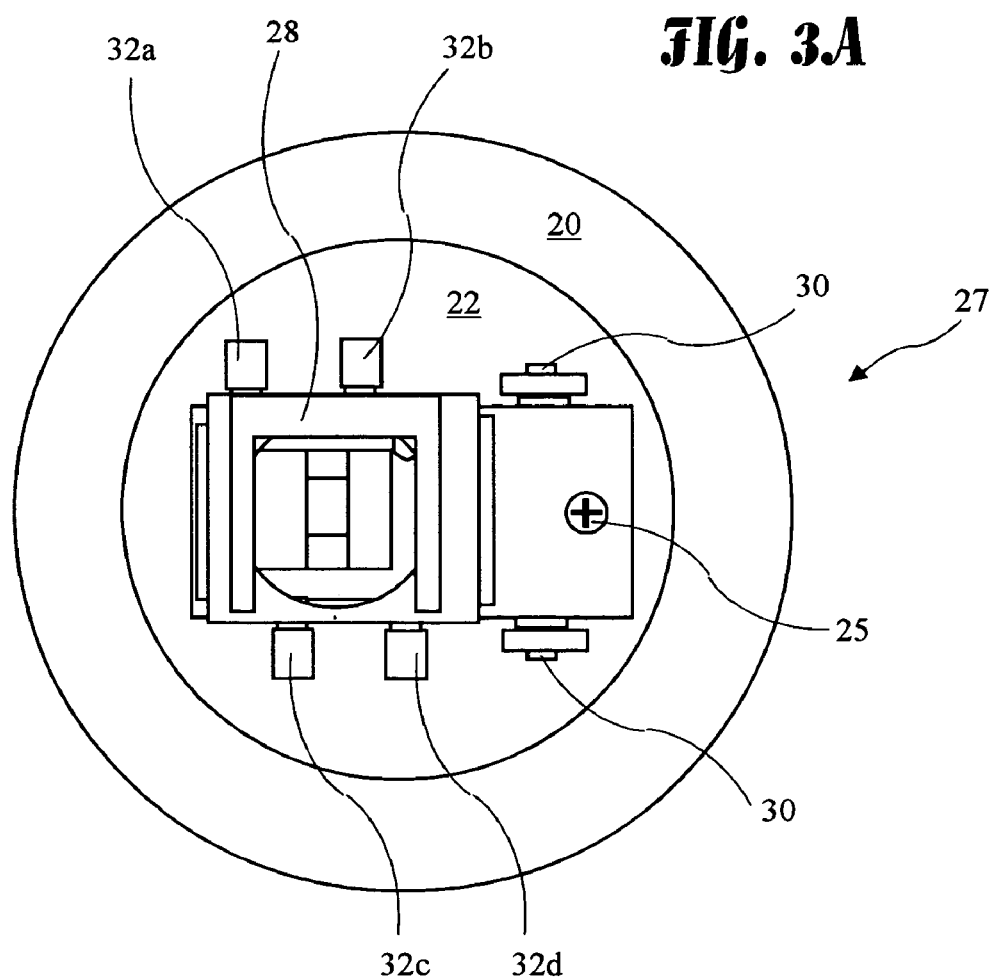
FIG. 3B is a top view of the projector assembly.

A side view of a projector assembly 27 is shown in FIG. 3A, and a top view of the projector assembly 27 is shown in FIG. 3B. The projector body 20 tilts about a pivot 30. A lamp holder 28 holds a lamp (e.g., a light bulb) in place to provide a source of illumination. An aperture assemble 50 (or adjustable aperture) resides below the lamp holder 28 and allows adjustment of the shape of the illumination 18 (see FIG. 1.) The aperture assembly 50 includes handles 32a, 32b, 32c, and 32d for adjustment. The four handles 32a–32d reside on at most three sides of the aperture assembly 50, and preferably reside on two opposing sides of the aperture assembly 50. An elevation screw 25 cooperates with the lamp holder to move the lamp holder 28 toward and away from the aperture assembly 50.

Figure 4A:
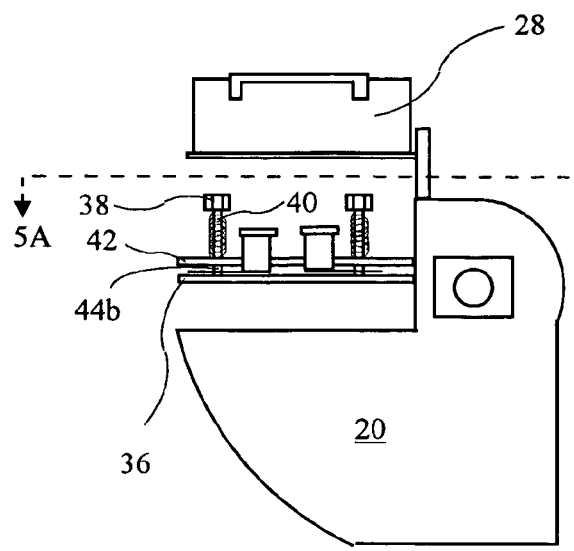
FIG. 4A is a side view of the projector assembly with a trim plate removed.
Figure 4B:
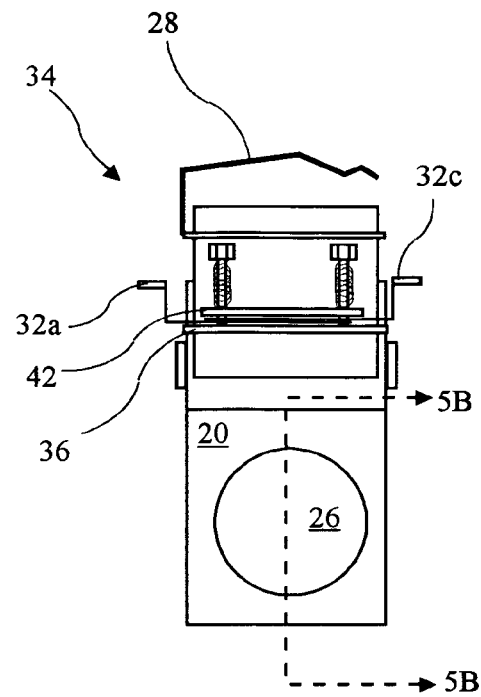
FIG. 4B is a front view of the projector assembly with the trim plate removed.
Figure 5A:
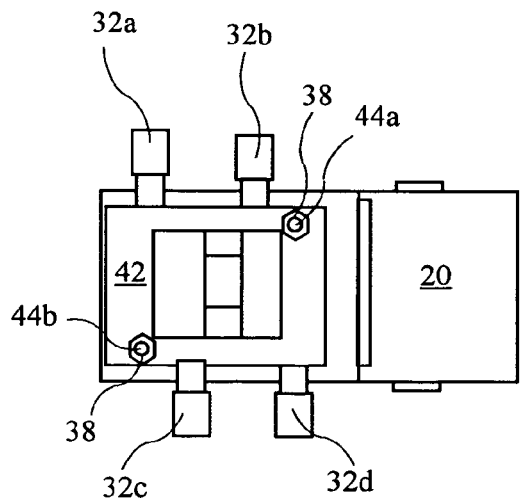
FIG. 5A is a top view of an aperture assembly taken along line 5A—5A of FIG. 4A, attached to the projector assembly.

A side view of the projector assembly 34 with the trim plates 20, 22 removed is shown in FIG. 4A, and a front view of the projector assembly 34 with the trim plates 20, 22 removed is shown in FIG. 4B. A top view of the aperture assembly 50 (see FIG. 3A) attached to the projector assembly 27 is shown in FIG. 5A. The aperture assembly 50 includes a platform 36, a hold-down plate 42, hold-down springs 40 and hold-down nuts 38 residing in opposite corners of the aperture assembly 50. The hold-down plate 42 is urged towards the platform 36 by the two hold-down springs 30 residing in opposite corners of the adjustable aperture 50. The hold-down springs 40 reside over left rear hold-down screw 44a and right front hold-down screw 44b which pass through openings 45 in the hold-down plate 42.

Figure 5B:
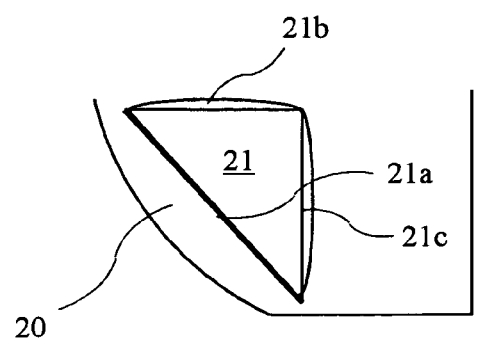
FIG. 5B is a cross-sectional view taken along line 5B—5B of FIG. 4B showing a reflector in the projector body.

A cross-sectional view taken along line 5B—5B of FIG. 4B showing a reflector 21 in the projector body 20 is shown in FIG. 5B. The reflector 21 reflects light at about a 90 degree angle, and allows construction of a compact framing projector 10 with a light source and adjusting features behind a surface the framing projector 10 is mounted to. The aperture assembly 50 resides between the lamp holder 28 and the reflector 21, thereby adjusting the shape of the illumination 18 (see FIG. 1), and the reflector 21 is preferably a mirror or a prism, and is more preferably a prism made from an acrylic block with a 45 degree mirror face 21a, a first optic lens 21b for receiving light from the light source, and a second optical lens 21c for emitting light.

A detailed top view of the aperture assembly 50 is shown in FIG. 6, and a detailed side view of the aperture assembly 50 in an expanded form is shown in FIG. 7. The aperture assembly 50 includes a first (or left) shutter 48a having the first handle 32a, a second (or rear) shutter 48b having the second handle 32b, a third (or front) shutter 48c having the third handle 32c, and a fourth (or right) shutter 48d having the fourth handle 32d. The shutter 48a–48d are sandwiched between the platform 36 and the hold-down plate 42, wherein the first shutter 48a and the fourth shutter 48d reside above the platform 36 and below the second shutter 48b and the third shutter 48c, and the hold-down plate 42 resides above the second shutter 48b and the third shutter 48c.

Preferably, a bottom low friction pad 46a resides between the platform 36 and the first shutter 48a and fourth shutter 48d, a middle low friction pad 46b resides above the first shutter 48a and the fourth shutter 48d and below the second shutter 48b and the third shutter 48c, and a top low friction pad 46c resides above the second shutter 48b and the third shutter 48c and below the hold-down plate 42. The low friction pads 46a, 46b, and 46c are preferably sheets of the type sold under the trademark TEFLON. A plane view of a low friction pad 46a is shown in FIG. 7A. The low friction pads are secured in place by the passage of the hold-down screws 44a and 44b (see FIG. 5A) through holes 45. Because the low friction pads are secured, the movement of one shutter does not move an adjacent shutter.

A detailed view of the hold-down plate 46 of the aperture assembly 50 is shown in FIG. 8. The hold-down plate 46 includes two holes 45a for passage of the hold-down screws 44 (see FIG. 5A).

The shutters 48a–48d of the aperture assembly 50 are shown in FIG. 9 as the shutters 48a–48d reside in the aperture assembly 50, and the shutters 48a–48d are shown separated in FIG. 10. Each shutter 48a–48d includes a shutter slot 54, wherein the shutter slots 54 cooperate with the hold-down screws 44 (see FIG. 5) to provide a range of motion for the shutters 48a–48d. Thus, the first shutter 48a may pivot around the shutter screw 44a and may slide right to left, the second shutter 48b may pivot around the shutter screw 44a and may slide front to rear, the third shutter 48c may pivot around the shutter screw 44b and may slide front to rear, and the fourth shutter 48d may pivot around the shutter screw 44b and may slide right to left. The four shutters 48a–48d thus provide for adjustment of size and shape of the illumination 18. The inner edge 52 of each shutter is slightly concave (which results in convex sides of the resulting aperture) as shown in FIG. 10 to compensate for optical effects which otherwise result in the illumination 18 (see FIG. 1) having concave edges.

Figure 11A:
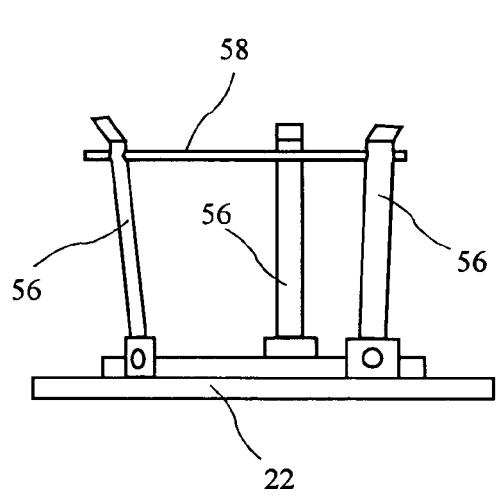
FIG. 11A shows a side view of fingers attached to the trim plate.
Figure 11B:
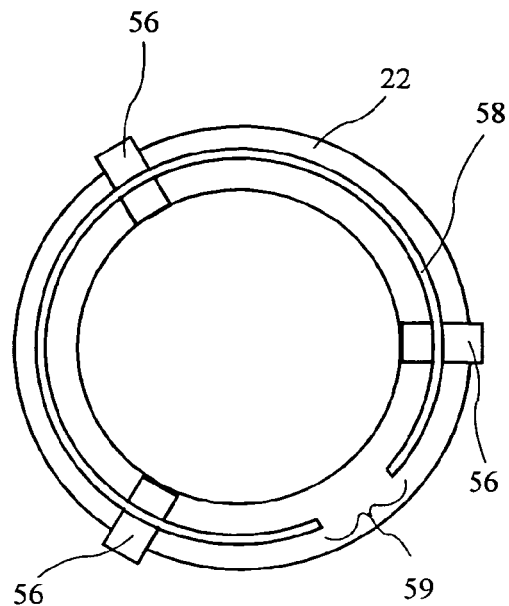
FIG. 11B shows a top view of the fingers attached to the trim plate.

A side view of fingers 56 attached to the trim plate 22 is shown in FIG. 11A, and a top view of the fingers 56 attached to the trim plate 22 is shown in FIG. 11B. An expanding C-shaped ring 58 urges the fingers 56 outward. The ring 58 has a gap 59 which allows the ring 58 to be squeezed to a smaller diameter, for example, for assembly.

Figure 12:
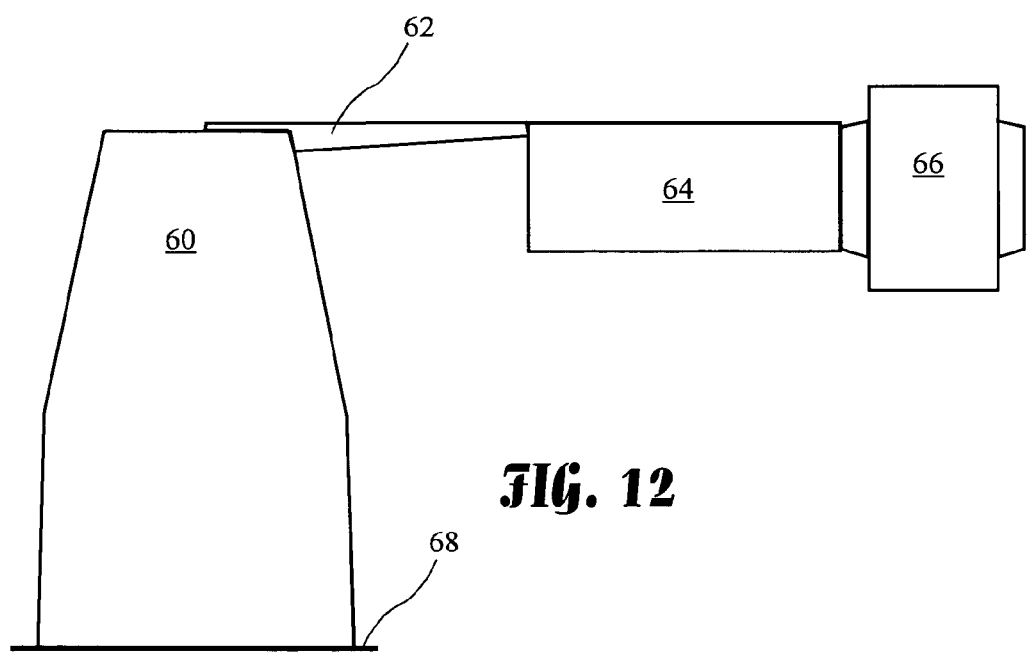
FIG. 12 shown a canister, junction box, and transformer used to install the framing projector.

A canister 60, brace 62, junction box 64, and transformer 66 used in conjunction with the framing projector 10 are shown in FIG. 12. The canister 60, brace 62, junction box 64, and transformer 66 may be mounted above the ceiling 12 (see FIG. 1) to facilitate the installation of the framing projector 10. The framing projector 10 preferably uses a low voltage light bulb, and the transformer 66 provides the required power for such low voltage light bulb. The junction box 64 is provided for electrical connections.

Figure 13B:
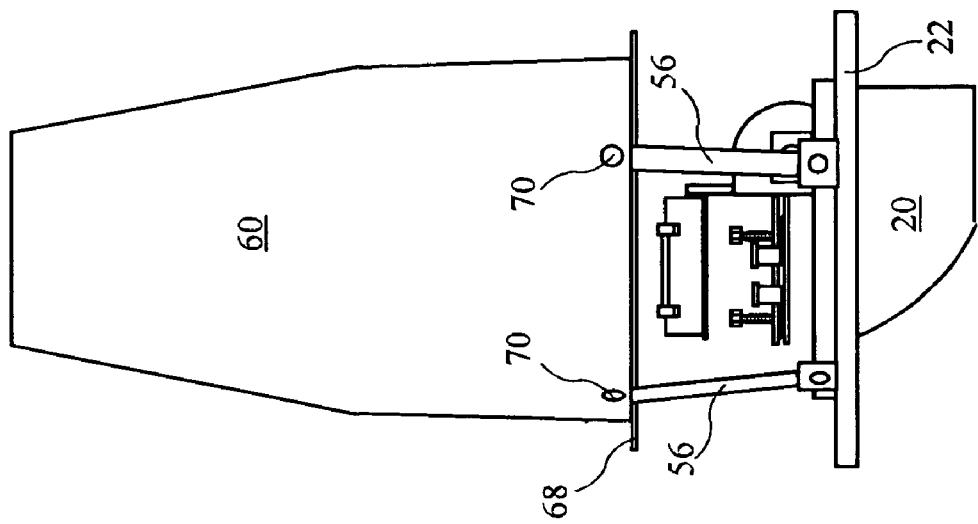
FIG. 13B depicts the framing projector extended from the canister.
Figure 13A:
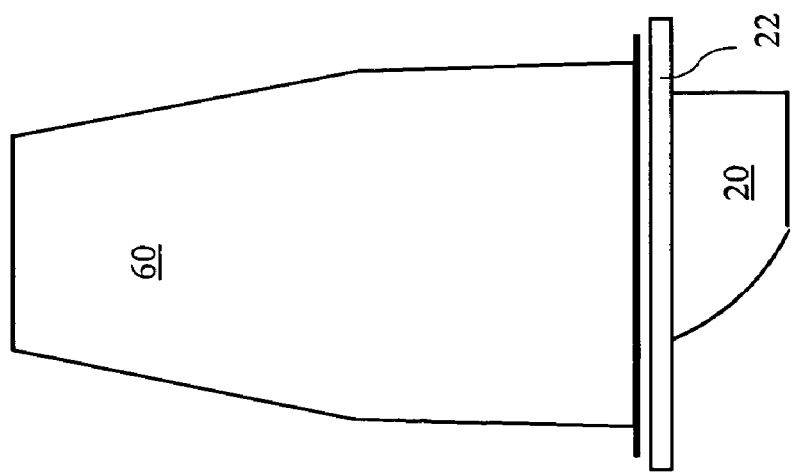
FIG. 13A depicts the framing projector residing in the canister.

The framing projector 10 is depicted residing in the canister 60 in FIG. 13A, and the framing projector 10 is depicted extended from the canister 60 in FIG. 13B. The fingers 56 may be squeezed inwardly by squeezing the ring 58 to cooperate with an inside surface of the canister 60 to hold the framing projector in position. Stops 70 are attached to the canister 60 to limit the extension of the framing projector 10 from the canister 60 by contact of the stops 70 with the ring 58. When the framing projector 10 is extended from the canister 60, the handles 32a–32d are exposed thus allowing adjustment of the illumination 18.

While the invention herein disclosed has been described by means of specific embodiments and applications thereof, numerous modifications and variations could be made thereto by those skilled in the art without departing from the scope of the invention set forth in the claims.

I claim:

1. A framing projector comprising:
   a trim plate adapted to reside proximal to a surface;
   a projector assembly tiltably connected to the trim plate and passing through the trim plate;
   a light source attached to the projector assembly;
   a reflector adapted to direct light from the light source; and
   an adjustable aperture residing between the light source and the reflector, the adjustable aperture comprising:
      a first shutter having a first handle;
      a second shutter having a second handle;
      a third shutter having a third handle; and
      a fourth shutter having a fourth handle,
   wherein:
      the projector assembly is tiltable to position an area of illumination; and
      the shutters are adjustable using the handles to adjust the shape of the illumination.

2. The framing projector of claim 1, wherein the adjustable aperture has four aperture sides and the handles extend from at most three of the four aperture sides.

3. The framing projector of claim 2, wherein the handles extend from two of the four aperture sides.

4. The framing projector of claim 3, wherein the two of the four sides are two opposing sides of the four aperture sides.

5. The framing projector of claim 1, wherein the adjustable aperture includes a platform and a hold-down plate, wherein the shutters and at least one pad reside between the platform and the hold-down plate, thereby reducing friction when the shutters are adjusted.

6. The framing projector of claim 5, wherein:
   the first shutter comprises a left shutter;
   the second shutter comprises a rear shutter;
   the third shutter comprises a front shutter;
   the fourth shutter comprises a right shutter;
   the first shutter and the fourth shutter reside above the platform and below the second shutter and the third shutter;
   the hold-down plate resides above the second shutter and the third shutter;
   a bottom pad resides between the platform and the first shutter and the fourth shutter; and
   a top pad resides between the second shutter and the third shutter and the hold-down.

7. The framing projector of claim 6, wherein a middle pad resides above the first shutter and the fourth shutter and below the second shutter and the third shutter.

8. The framing projector of claim 7, wherein the pads are Teflon® sheets.

9. The framing projector of claim 6, wherein the hold-down plate is urged towards the platform by two hold-down springs in opposite corners of the adjustable aperture.

10. The framing projector of claim 9, wherein the shutter include shutter slots and wherein the hold-down springs reside over hold-down screws, wherein the shutter slots cooperate with the hold-down screws to provide a range of motion for the shutters.

11. The framing projector of claim 6, wherein the adjustable aperture includes an aperture opening formed by the shutters, and wherein each shutter forms one side of the aperture opening, and wherein the sides of the aperture opening are convex.

12. The framing projector of claim 1, further including a canister, wherein the canister is mountable substantially behind the surface and the trim plate mechanically cooperates with the canister to allow the trim plate to be pulled away from the surface to allow access to the handles.

13. The framing projector of claim 12, wherein fingers are attached to the trim plate, and wherein the fingers cooperate with an inner surface of the canister to allow the trim plate to be pulled away from the surface.

14. The framing projector of claim 13, further in including a C-shaped ring residing near ends of the fingers opposite the trim plate and for applying outward force on the fingers, wherein the canister includes stops to limit the distance the trim plate may be pulled away from the surface, wherein the ring cooperates with the stops.

15. The framing projector of claim 1, wherein the trim plate comprises an outer trim plate and an inner trim plate, wherein the inner trim plate rotates with respect to the outer trim plate to allow further adjustment of the position of the illumination.

16. A framing projector comprising:
   a trim plate adapted to reside proximal to a surface;
   a projector body tiltably connected to the trim plate and passing through the trim plate;
   a light source attached to the projector body;
   a reflector residing inside the projector body and adapted to direct light from the light source; and
   an adjustable aperture residing between the light source and the reflector, the adjustable aperture comprising:
      a first shutter having a first handle;
      a second shutter having a second handle;
      a third shutter having a third handle; and
      a fourth shutter having a fourth handle,
   wherein:
      the projector body is tiltable with respect to the trim plate to position an area of illumination;
      the shutters are adjustable using handles to adjust the shape of the illumination;
      the adjustable aperture has four aperture sides and the handles extend from two opposite sides of the four aperture sides.

17. The framing projector of claim 16, wherein:
   the adjustable aperture includes a platform and a hold-down plate;
   the first shutter comprises a left shutter;
   the second shutter comprises a rear shutter;
   the third shutter comprises a front shutter;
   the fourth shutter comprises a right shutter;
   the first shutter and the fourth shutter reside above the platform and below the second shutter and the third shutter;

the and the hold-down plate resides above the second shutter and the third shutter;

a bottom pad resides between the platform and the first shutter and the fourth shutter; and a top pad resides between the second shutter and the third shutter and the hold-down.

18. The framing projector of claim 17, wherein a middle pad resides above the first shutter and the fourth shutter and below the second shutter and the third shutter.

19. A framing projector comprising:
a trim plate adapted to reside proximal to a surface;
a projector assembly tiltably connected to the trim plate and passing through the trim plate;
a light source attached to the projector assembly;
a reflector adapted to direct light from the light source;
an adjustable aperture residing between the light source and the reflector, the adjustable aperture comprising:
a first shutter having a first handle;
a second shutter having a second handle;
a third shutter having a third handle; and
a fourth shutter having a fourth handle; and
a canister mountable substantially behind the surface, wherein the trim plate mechanically cooperates with the canister to allow the trim plate to be pulled away from the surface to allow access to the handles;
wherein:
the projector assembly is tiltable to position an area of illumination; and
the shutters are adjustable using handles to adjust the shape of the illumination.

20. The framing projector of claim 19, wherein the adjustable aperture has four aperture sides and the handles extend from two opposite sides of the four aperture sides.

* * * * *